United States Patent [19]

Balduzzi et al.

[11] 4,162,036

[45] Jul. 24, 1979

[54] SOLID STATE THERMOSTAT WITH DIGITAL DISPLAY

[75] Inventors: Richard R. Balduzzi, Van Buren Rd., Syracuse, N.Y. 13209; Richard W. French, Liverpool, N.Y.

[73] Assignee: Richard R. Balduzzi, Syracuse, N.Y.

[21] Appl. No.: 851,507

[22] Filed: Nov. 14, 1977

[51] Int. Cl.$^2$ .................. G05D 23/00; F23N 5/20
[52] U.S. Cl. .................. 236/47; 236/46 R; 340/309.4
[58] Field of Search .................. 340/309.1, 309.3, 588, 340/309.4; 328/3; 307/310, 117; 236/47, 46, 1 B, 78; 165/11, 12, 26; 58/24 R, 39.5

[56] References Cited

U.S. PATENT DOCUMENTS

| 3,906,797 | 9/1975 | Turner | 73/362 AR |
| 4,068,526 | 1/1978 | Goldstein | 73/362 AR |
| 4,079,366 | 3/1978 | Wong | 340/309.4 |

Primary Examiner—William E. Wayner
Assistant Examiner—Harry B. Tanner
Attorney, Agent, or Firm—Bruns & Jenney

[57] ABSTRACT

A solid state thermostatic device having two programmable temperature control circuits, one of which, when energized, serves to maintain a comfort controlled region at a high temperature level and the other of which, when energized, serves to maintain the comfort controlled region at a lower level. Two clocks are contained within the device for recording real time and for generating an alarm signal when a set time stored in the clock is reached. The two alarm signals generated by the clocks electrically energize the control circuits to regulate the temperature in the comfort control region at the programmed levels during a selected period of time. A digital display is also provided for supplying a visual readout of selected system related parameters including the real time and the stored time contained in each clock and the temperature within the comfort controlled region both in degrees Celsius and Fahrenheit. The display also permits real time and alarm time to be accurately and conveniently set into the clocks.

12 Claims, 9 Drawing Figures

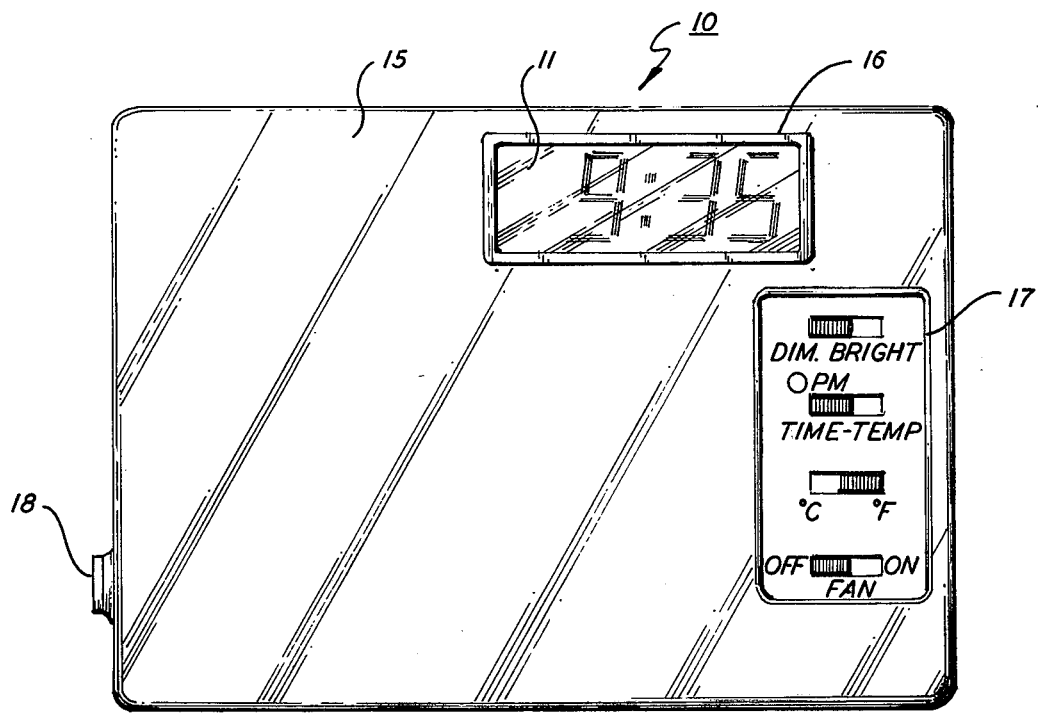
FIG. 1
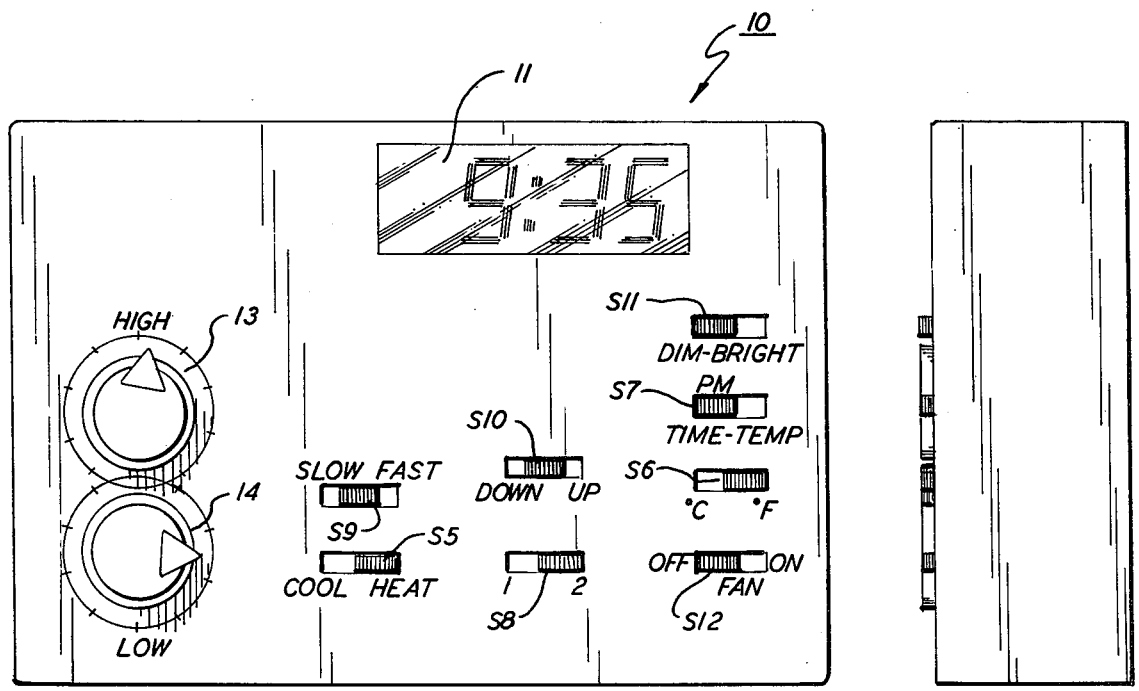
FIG. 2
FIG. 3

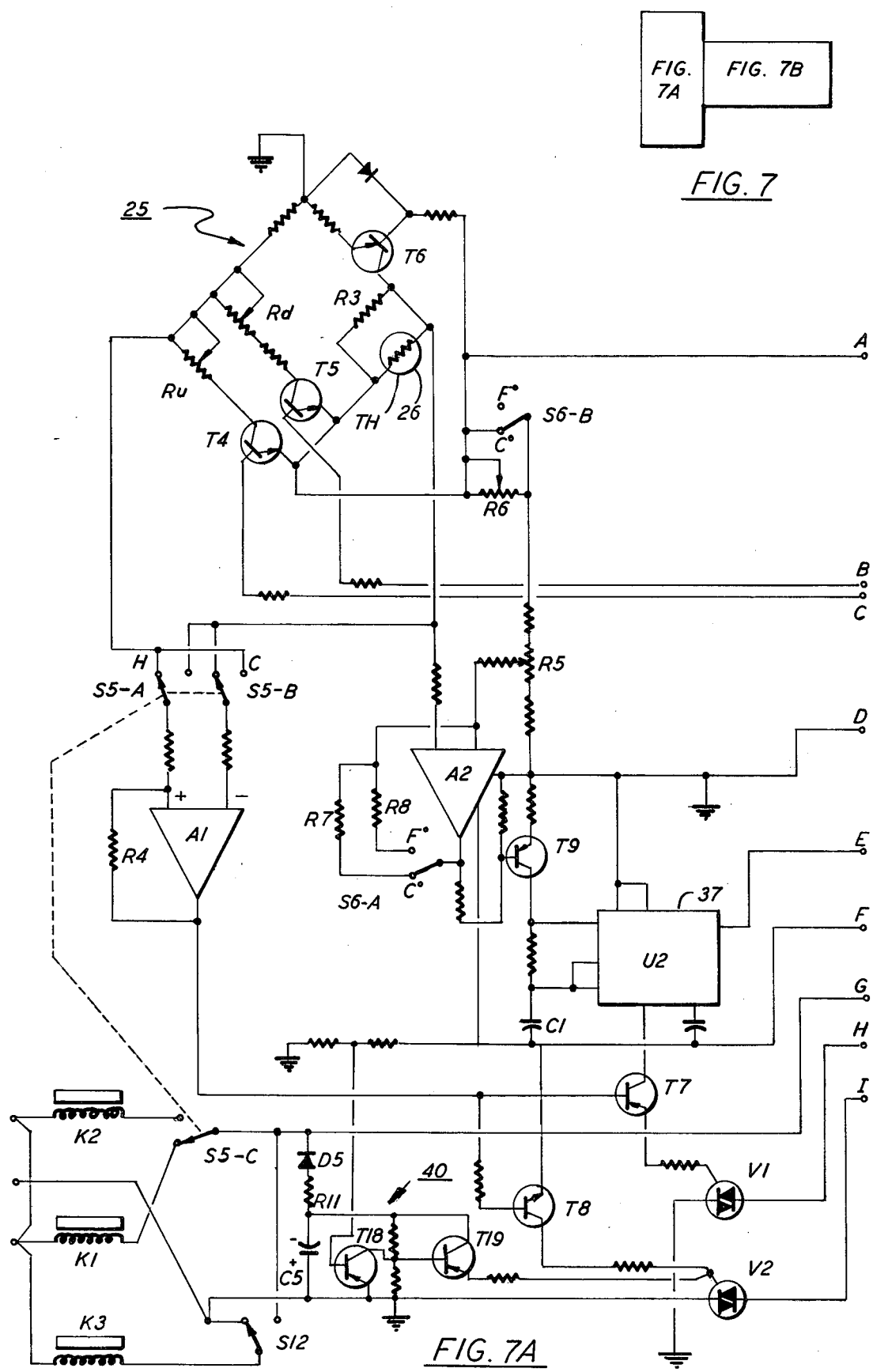

SOLID STATE THERMOSTAT WITH DIGITAL DISPLAY

BACKGROUND OF THE INVENTION

This invention relates to a solid state thermostatic device having a digital display capable of providing a visual readout of selected system related data.

As illustrated by U.S. Pat. No. 3,964,677, solid state thermostatic control devices are known in the art. As is well known, these solid state devices consume little energy, and are thus inexpensive to operate, and can be packaged in compact attractive units that are suitable for mounting on the wall of a room in a home or an office.

As disclosed in the above noted patent, the importance of conserving energy has pointed up the need for control devices which will automatically reduce the temperature level in an air conditioned region during the hours when the region is not being occupied or actively used. Typically this will occur during the nighttime hours. Accordingly, most thermostats are now being equipped with two channel control circuits which can be independently programmed to maintain the controlled region at a higher temperature for a selected period of the day and a lower temperature for the remainder of the day.

One serious drawback associated with many multichannel control systems, whether solid state or otherwise, resides in the fact that the device is extremely difficult to set up or program so as to carry out the desired energy saving functions. This is due, among other things, to the fact that the adjustable controls for programming the device are typically situated in a relatively inaccessible location and, furthermore, the controls are difficult to read. Accurate programming of the equipment thus becomes a tedious and time consuming process. By the same token, once the device is set up, it is hard to determine at some later date what values were put into the controls. As a consequence, the thermostat will oftentimes be misused or the energy saving feature neglected thus defeating the purpose for which it was designed.

SUMMARY OF THE INVENTION

It is therefore an object of the present invention to improve solid state multichannel thermostatic control devices.

Another object of the present invention is to provide a solid state thermostatic control device having a digital display for supplying a visual readout of selected system related values.

A further object of the present invention is to conserve energy by supplying a thermostatic control that can be easily programmed to automatically hold an air conditioned region at a first temperature level for one period of the day and at a reduced temperature for the remainder of the day and which can provide an instantaneous readout of the programmed times upon demand.

A still further object of the present invention is to provide a thermostatic control equipped with a digital readout capable of presenting real time or, at the option of the user, the temperature within a control region in either degrees Celsius or degrees Fahrenheit.

These and other objects of the present invention are attained by a solid state thermostatic control device having multichannel control circuits for holding a comfort controlled region at different temperatures during selected time periods, the device further including a digital display that is arranged to supply an easily readable visual presentation of selected times and temperatures related to the system. The display is also adapted to permit control values to be accurately stored in the system.

BRIEF DESCRIPTION OF THE DRAWINGS

For a better understanding of the invention as well as other objects and further features thereof, reference is had to the following detailed description of the invention to be read in connection with the accompanying drawings wherein:

FIG. 1 is a front elevation showing the thermostatic control panel employed in the present invention with the panel cover in place;

FIG. 2 is also a front elevation of the control panel shown in FIG. 1 with the cover removed to further disclose the control mechanism associated with the invention;

FIG. 3 is an end view of the control panel seen in FIG. 2;

DESCRIPTION OF THE PREFERRED EMBODIMENT

Figure 4:
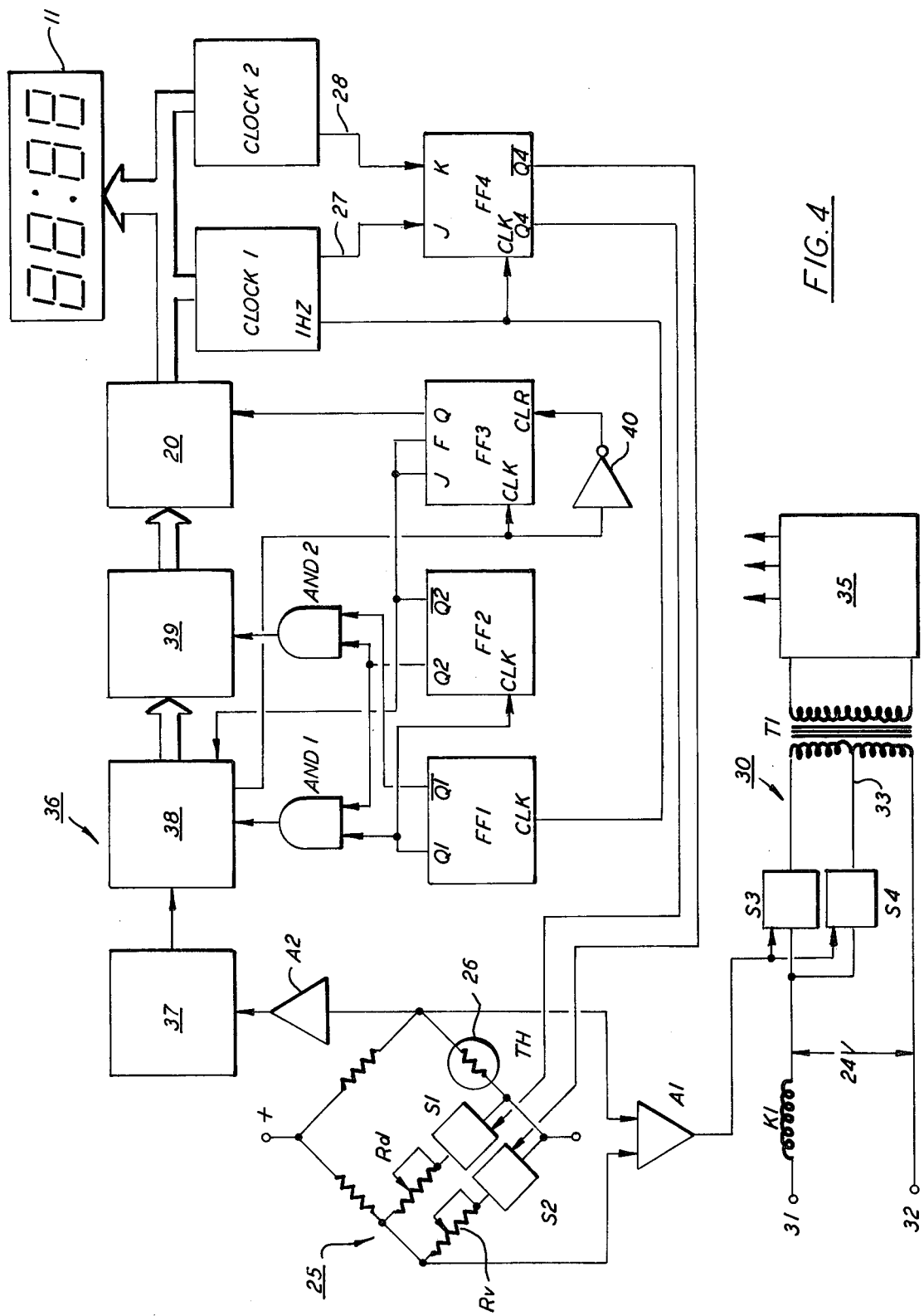
FIG. 4 is a block diagram illustrating the configuration of the major electrical components making up the apparatus of the present invention.

Referring now to the drawings, there is shown in FIGS. 1-3 a control panel 10 associated with the thermostatic control device of the present invention including a digital display 11 and a number of manually operative switches and two temperature selection dials 13,14, the function of which will be explained in greater detail below. The panel is supplied with a cover 15 having two windows 16,17 in the side wall thereof. Window 16 allows the digital display to be viewed when the cover is in place as shown in FIG. 1 while window 17 provides access to four function related switches located on the face of the panel. The cover to the panel, when in place, effectively shields the remaining switches and dials to prevent their settings from being tampered with. The latter feature is important when the device is located in a public place, such as a store or office, where it could be set and reset by a number of different individuals thus calling for unwanted, and typically wasteful, cycling of the air conditioning equipment. A lock 18 (FIG. 1) may also be provided to prevent unauthorized removal of the cover.

Normally, an illuminated digital presentation of actual or real time is displayed in the window. However, the presentation can be selectively changed to furnish other system related information therein by which the temperature in a controlled region, such as a home, office, or the like, may be accurately regulated. Because of the solid state construction of the device herein described, the unit, as illustrated in FIGS. 1-3, can be compressed into a compact, low profile, aesthetically pleasing package suitable for mounting upon a wall within the control region.

Referring now more specifically to FIG. 4, there is depicted a block diagram of the electrical components of the present invention. The digital display 11 is arranged to be driven by anyone of three encoded inputs which include CLOCK 1, CLOCK 2 and a transmission gate 20 that forms part of the temperature measuring channel utilized in the present device. Both clocks are commercially available, large scale, integrated circuits capable of operating on 50 or 60 Hertz. The clocks are electrically wired to the display to provide a shifting encoded signal indicative of the real time kept by the clock. The time is recorded in the display as a visual signal by light emitting diodes (LEDs) contained therein. In this case seven segments or bits of coded information are required to provide each of the diodes with sufficient data to generate digits 0 through 9. In addition to furnishing a real time input to the display, each clock is able to independently generate an alarm signal at a prescribed time programmed into and stored in the clock. As will be explained below, the transmission gate is arranged to send an encoded signal to the input of the display to supply a visual readout of the temperature in the air conditioned region. Switching circuitry is operatively associated with the three inputs to the display whereby either one of the two clocks or the transmission gate may be selected to drive the display. The outputs of the two non-selected drives are electrically placed at an extremely high impedance state whereby they appear to the input of the display as an electrically open circuit. By using this type of wired-OR circuit arrangement, the many inputs to the light emitting diodes required from the three input drives can be conveniently wired to the same shared loads while still allowing for an input selector without having to break the numerous connections involved.

In practice both clocks are set to the correct time by operating appropriate switches on the panel which serves to electrically connect a selected clock to the display and which operates to advance the time setting displayed at chosen increments to the correct or real time setting. Normally, this actual time setting will only be required in the event electrical power to the clock has been interrupted. The alarm times stored in the clocks are programmed into the clock in a manner similar to that described above. Down time is set into CLOCK 1 and up time into CLOCK 2. Down time, as herein used, refers to the beginning of the time interval when the thermostatic device operates to hold the control region at a relatively low temperature level and up time as the beginning of the time interval when the control region is being held at a higher temperature level.

Referring once again to the block diagram shown in FIG. 3, a bridge circuit, generally referenced 25, is furnished which includes a temperature dependent thermistor 26 of well known construction whose resistance decreases proportionally with an increase in temperature. In practice the thermistor is located in the air conditioned region in a position where it is exposed to ambient conditions. A pair of electronic switches S1 and S2 are placed in parallel circuits over the opposite side of the bridge with each switch being in series with temperature control potentiometers Rd and Ru, respectively. The control dials for the potentiometers are located on the face of the panel, as shown in FIG. 2, and are depicted with references 14 and 13, respectively.

The alarm circuit of each clock is connected to one of the inputs of flip flop FF4 via lines 27,28. The outputs of the flip flop, in turn, are connected to the two electronic switches S1,S2 in the bridge circuit. It will be assumed for explanatory purposes that the alarm time stored in CLOCK 1 is reached and the alarm circuit voltage level thus increased to a high value causing the flip flop to change state. This change of state causes the Q output to go high and the Q output to go low. With the outputs in this state, switch S1 is turned on and S2 is turned off. Potentiometer Rd, which is in series with switch S1, is thus selected to act in concert with the thermistor to regulate the temperature in the air conditioned region.

As noted, CLOCK 1 controls the down time period and therefore when its alarm time is reached, and the resistance Rd operatively placed into the bridge, an unbalanced condition is produced over the bridge. Accordingly, the output of the operational amplifier A1, which is arranged to compare the voltage over the thermistor with the preset reference voltage, is placed at a polarity to condition electronic switches S3 and S4 in the power supply circuit 30 to hold the air conditioning equipment active until such time as the bridge balance is restored. As shown schematically in FIG. 4, the equipment on-off function is regulated by a relay K1 located in the 24 volt power supply circuit. In practice the 24 volt input is drawn directly off the equipment power supply at terminals 31,32. To hold the equipment inactive, relay K1 is deenergized by turning electronic switch S3 off and turning electronic switch S4 on.

A tap 33 is placed on the primary side of the power supply transformer T1 and is positioned so that when switch S4 is off and switch S3 is on, insufficient voltage is dropped over the relay to produce energization. However, current will flow through the windings to furnish sufficient voltage across the primary side of the transformer to produce a secondary voltage for powering the various thermostatic electronic components via power supply 35. Similarly, placing S4 in an on position and S3 in an off position causes K1 to be energized. By properly positioning the tap, a part of the total voltage is dropped over the relay while the remaining voltage is used to energize the secondary windings of the transformer and thus hold the power supply active.

The bridge circuit 25 of the instant apparatus is also employed to provide temperature information to a temperature measuring channel, generally referenced 36. As schematically represented in FIG. 4, a second amplifier A2 is adapted to compare the voltage developed over the thermistor 26 against a reference voltage and apply an amplified temperature indicative voltage signal to a frequency converter 37. The V/F converter, in turn, produces an output in the form of a train of pulses having a frequency or occurrence rate which is proportional to the amplified voltage input and thus proportional to the temperature sensed by the thermistor.

The frequency signal developed by the V/F converter is then sent to a binary coded decimal (BCD) counter 38 which counts the number of pulses received from the converter within a given time period. As will be explained below, the counter is gated on and off to take a two second count during each sampling period. In operation, the unit contains two counters, a first for counting tens of pulses during the sample period and the second for counting units of pulses during the same period. At the end of the period, the count is passed on to a BCD to 7-segment decoder 39 which places the temperature indicative count into an encoded signal suitable for driving the LED display. The encoded signal is sent to the transmission gate 20 where it is held until such time as the gate is conditioned to pass the encoded signal on to the display.

A pair of flip-flops FF1 and FF2 plus two gates, AND 1 and 2, are utilized to supply the desired two second sample period for controlling the appropriate circuits in the temperature measuring channel. Again referring to FIG. 4, CLOCK 1 is employed to provide a 1 Hz signal that is applied to the clock input of FF1 causing the state of its outputs to change every second.

Figure 5:
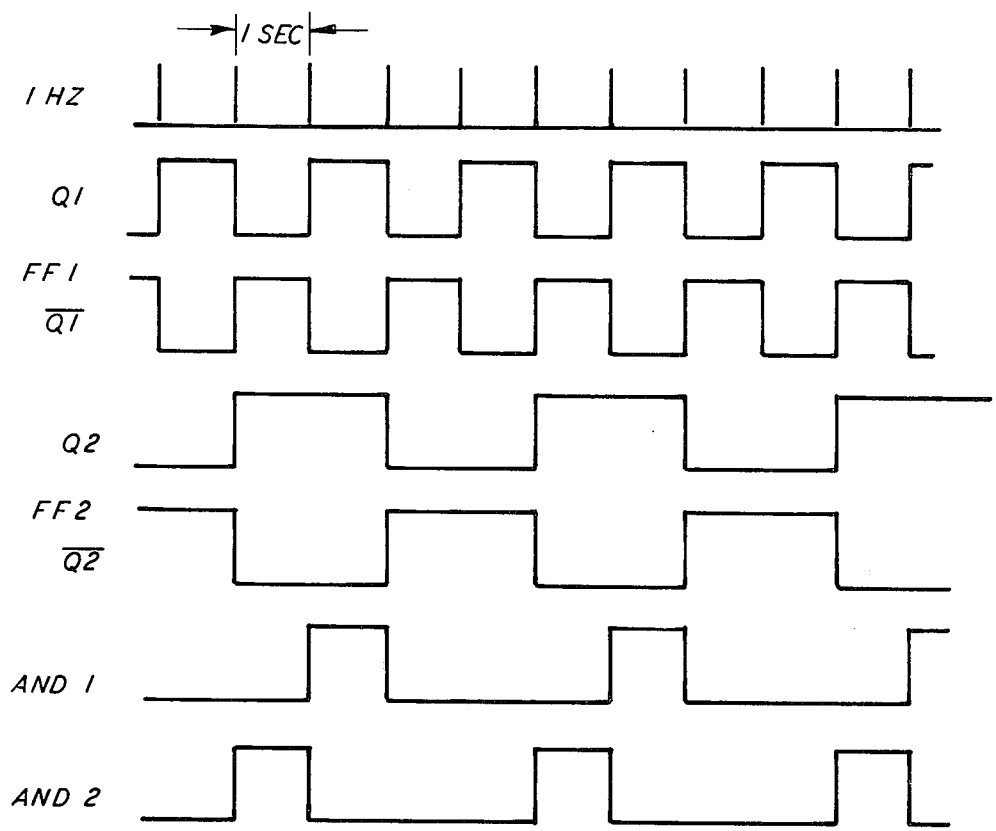
FIG. 5 is a timing diagram illustrating waveforms provided by various components of the controller contained in the temperature measuring channel of the present invention.

The waveform outputs from FF1 and 2 and those of gates AND 1 and 2 are shown in superimposed timed refraction with the 1 Hz signal of CLOCK 1 in FIG. 5. As can be seen with reference to FIG. 4, the Q1 output of FF1 is applied to the clock input of FF2 wherein FF2 changes state once for every two changes of state of FF1. In operation, the clock of FF2 is made on the occurrence of Q1 changing from a high state to a low state as illustrated in FIG. 5. The AND 1 gate is arranged in the temperature measuring channel to clear and enable the BCD counter to accept a new count preparatory to initiating the next counting sequence. The AND 1 gate is enabled once every four seconds when output Q1 of FF1 and Q2 of FF2 are both switched to a high state.

One second after the counters are enabled, a two second counting period is initiated by Q2 going to a high level. This causes a count signal to be applied to both counters in the BCD unit. At the end of the counting period outputs Q1 and Q2 of both flip flops reach a high level which causes gate AND 2 to be enabled. With this gate enabled, a latching signal is applied to the decoder unit to allow the unit to accept the count registered in the BCD unit and store it in a 7 segment form compatible with the LED display unit.

Figure 6:
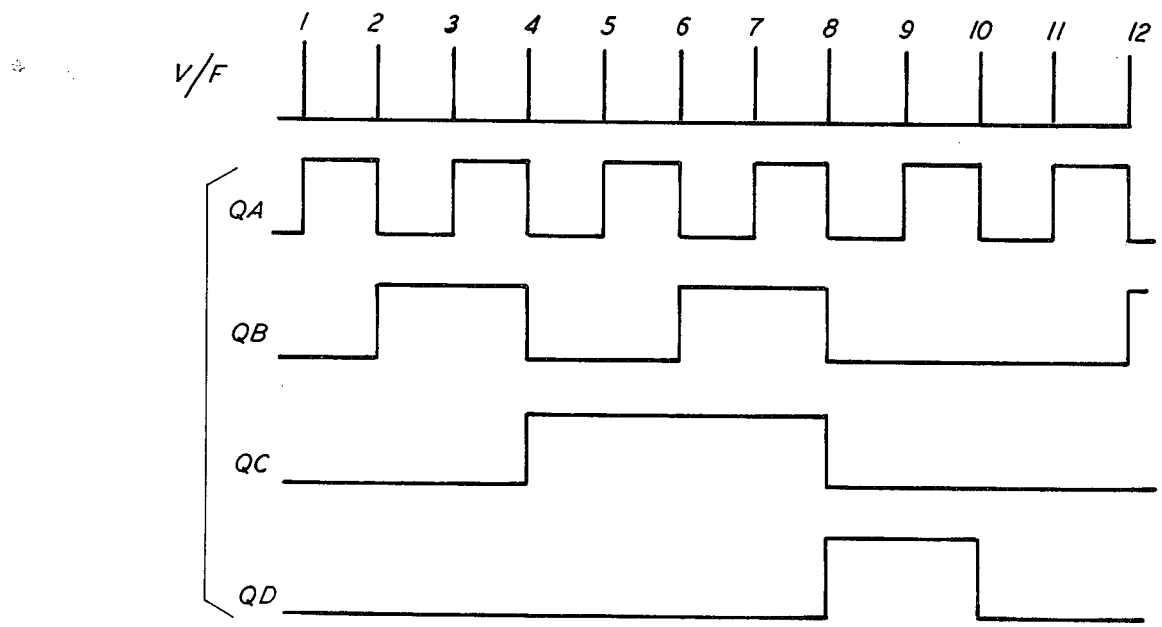
FIG. 6 is a series of waveforms provided by a counter utilized in the temperature measuring channel.

Referring now to FIG. 6, there is shown the output waveforms of the V/F converter which are a series of spikes that are numbered consecutively for the sake of convenience. Directly below the converter output is shown the binary coded output of the units counter. The high level of the output waveforms represents a binary "1" while low level represents a binary "0". Four output lines (QA–QD) are thus required to register ten decimal digits by binary numbers. The QD output of the units counter is applied to the input of the tens counter which is triggered by the negative going transition of the waveform that occurs upon the occurrence of the tenth input pulse to the unit counter. The tens counter is identical in operation with the units counter and, as a result, the unit can count up to ninety nine pulses. Upon the entry of the one hundredth pulse, both counters return to zero.

In practice the temperature measuring channel is arranged so that at the termination of a two second counting interval, the output of the two counters is a number in BCD format equal to the temperature sensed in the conditioned region. As can be seen, if the temperature reaches one hundred degrees within the two second counting period, the output of both counters will be at zero and the counters will have overflowed. The present apparatus is able to determine when an overflow condition has occurred and, in response thereto, records a hundred digit in the display thereby making it possible to display temperatures up to one hundred and ninety nine in the window. As noted, when the count reaches or exceeds one hundred, the QD output of the tens counter completes its negative going transition before the end of the counting period. The QD output of the tens counter is used to make the clock input of flip flop FF3. As shown in FIG. 4, the two second gate pulse, which is generated when the Q2 output of FF2 goes high, is also applied to the J and K inputs of FF3 which enables the flip flop for the two second period. In the event that the QD output of the tens counter occurs prior to the termination of the counting period, the flip flop FF3 will be caused to change state by the receipt of the clock pulse causing the Q3 output to go to a high state. With Q3 in a high state, an input signal is sent to the transmission gate triggering means to provide a hundreds digit to be presented in the displayed window.

Figure 7B:
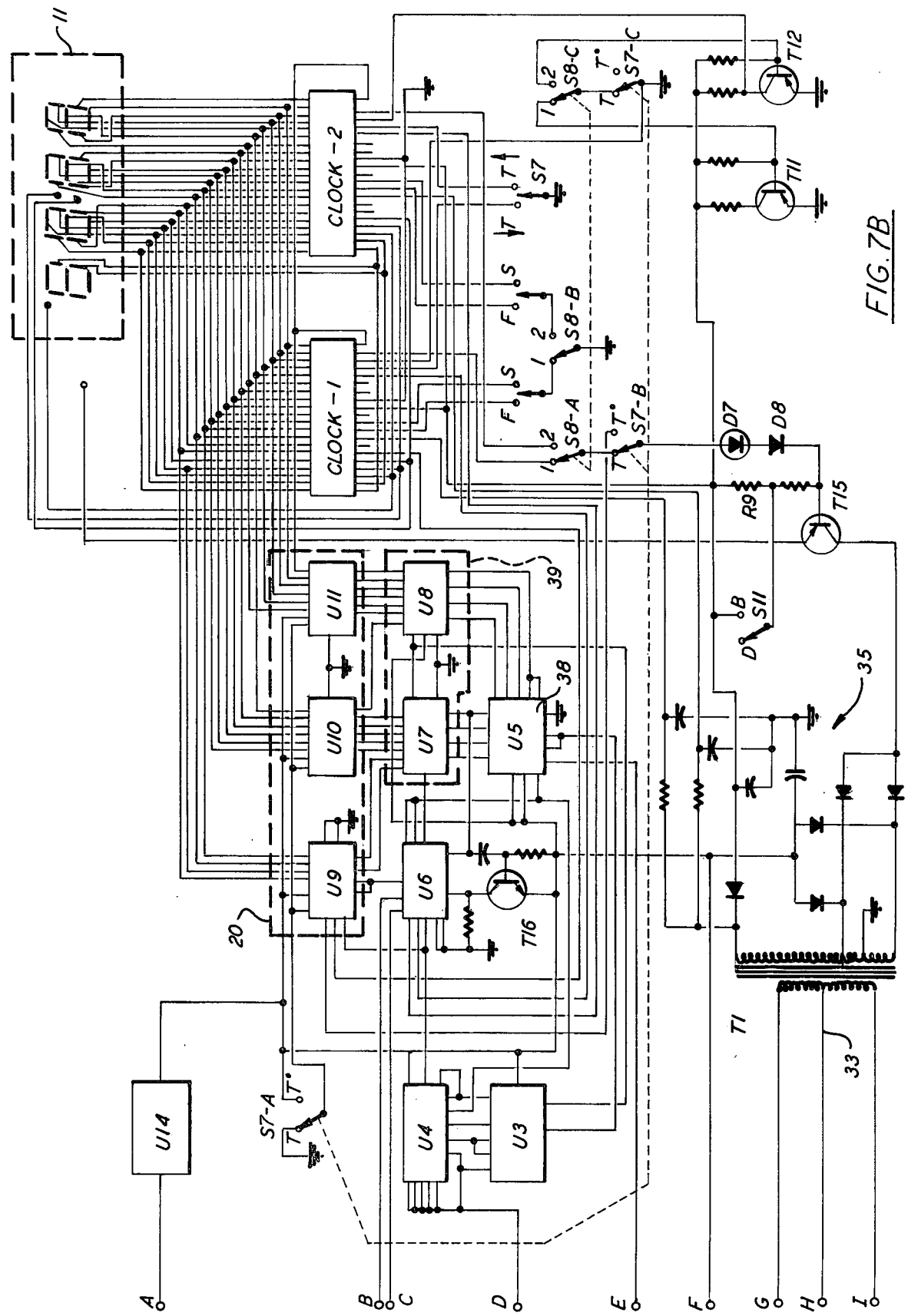
FIG. 7 is a schematic wiring diagram showing the relationship of the electrical components making up the present invention set out in views 7a and 7b.

Referring now more specifically to FIGS. 7A and 7B, which together represent a circuit diagram of the electrical components of the present invention, further operational features of the invention shall be described in greater detail. The diagram will be described in conjunction with the switches and dials contained on the control panel as shown in FIG. 2 and the block diagram previously described in reference with FIG. 4. The circuit diagram is contained in two sections, as shown in FIG. 7, with points A through I in FIG. 7A corresponding to the same points on FIG. 7B.

As illustrated in FIG. 7A, the bridge circuit 25 includes two temperature control circuits for regulating the operation of the air conditioning equipment in response to the alarm times stored in the two clocks. The desired down time temperature is set into variable resistor Rd by means of dial 14 (FIG. 2) while up time temperature is set at variable resistor Ru by means of dial 13. Each control circuit includes a transistor which functions as a switch for placing a selected resistance into the bridge network. The base of transistor T5, in the down time circuit, is connected to the Q4 output of FF4, which is part of dual J-K flip flop integrated circuit U6 containing FF3 and 4. Upon the generation of an alarm signal by CLOCK 1, the Q4 output goes high causing T5 to conduct. This, in effect, places Rd into the bridge. At this time output Q4, which is applied to the base of T4 in the up time circuit, goes low shutting off T4 and thus effectively removing Ru from the bridge. As can be seen, a change in state, which is produced by an alarm signal from CLOCK 2, turns off T5 and turns on T4 to place the up time circuit into the bridge.

The thermistor TH is positioned in a network designed to produce a linear response over a wide range of temperatures. Integrated circuit U14 is a voltage regulator that is adapted to place a regulated voltage on the base of transistor T6 to provide a constant current source for improving linearity. The voltage regulator provides a regulated voltage over the bridge circuit to prevent fluctuations in line voltage from affecting the accuracy of temperature sensing and measuring. A levelling resistor R3 is also shunted over the thermistor to further improve the linearity of the system.

Amplifier A1 is placed over the bridge to compare the amount of voltage dropped over the thermistor with that dropped over the selected temperature control circuit. The amplifier includes a positive feedback loop from the output through a fixed resistor R4 to the positive terminal. For practical purposes, the feedback loop provides an almost instantaneous and positive on-off response to the amplifier whereby the amplifier can be used as a trigger to control the air conditioning equipment. Resistor R4 furnishes the circuit with sufficient hysteresis to prevent the amplifier from triggering on or off at the same temperature.

When more heat is required in the conditioned region, an unbalanced condition is created over the bridge. The output of A1 is thus placed at a negative level causing T7 in the power supply circuit to conduct turning on triac V1. This, in turn, energizes one of two equipment control relays K1,K2. When heat is not required, the output of A1 will be positive and a positive signal is applied to the base of T8 causing it to conduct and thus turn on triac V2 whereby the control relays are deenergized taking the selected equipment off the line.

The triacs act as AC switches in the power circuit. If both triacs are deenergized at one time, as by a power interruption, power to thermostatic electronics, including the triac themselves, will be terminated and the electronics effectively locked out of the system. An auxillary turn-on circuit 40 is herein provided to prevent a lockout which includes transistors T18, T19. Whenever the 24 volt source is energized after an interruption, capacitor C5 is charged through diode D5 and resistor R11 to furnish sufficient DC voltage to turn on the circuit. Initially, at turn-on, T18 is in an off state due to the absence of electronics supply voltage. However, capacitor voltage is applied to T19 causing it to conduct and thus energize V2. This, in turn, provides voltage to the primary of T1 allowing current to flow to the various electronic circuits of the thermostat. A negative voltage is therefore furnished to the base of T18 turning it on and simultaneously turning T19 off to disconnect the turn-on circuit from the system to allow normal operations to be resumed.

Switch S5 (FIGS. 2 and 7) is a three function device by which the thermostatic control system is switched from heating to a cooling operation. By turning the switch from heating to cooling via contacts S5-A and S5-B, it reverses the inputs from the bridge to the amplifier and at the same time places the cooling relay K2 into the power supply circuit in place of the heating related relay K1 via contact S5-C.

Amplifier A-2 is arranged to compare the voltage over the thermistor to a set reference voltage provided by variable resistor R5. The output of the amplifier is applied to the base of transistor T9. As an increase in temperature is sensed by the thermistor, a decrease in voltage is felt over the device. This, in turn, drives the base of T9 negative producing an increase in collector current. As seen in FIG. 7A, the collector of T9 is connected to a capacitor C1 and the output of the transistor thus used to charge the capacitor. The capacitor is discharged by the V/F converter U2 when its potential reaches a particular value at which time an output pulse is produced by U2. As C1 charges more rapidly with an increase in sensed temperature, the output of the V/F converter will also be at a correspondingly higher pulse rate. By properly setting the reference voltage, the pulse rate output of the V/F unit will be indicative of the temperature sensed.

The present system is arranged so that the V/F output can be adjusted to provide a reading indicative of both degrees Celsius and degrees Fahrenheit. This function is provided by switch S6 (FIG. 2). Section S6-A of the switch is located in the negative feedback loop of amplifier A2 which is a high gain amplifier. The higher the resistance in the feedback circuit the higher the gain of the amplifier. Resistor R7 is a 100K ohm element and resistor R8 is a 180K ohm element. As can be seen, the two resistors are operatively connected in the circuit to provide a 1.8 conversion factor when the contact S6-A is moved from the Celsius to the Fahrenheit setting. A third variable resistor R6 is provided in the negative input circuit to A2. When section S6-B of the switch is moved to the Celsius setting, R6 will be shorted out. Moving the switch to a Fahrenheit position puts the added resistance into the circuit to supply a voltage offset sufficient to move the V/F output count the required 32 pulses for a two second sampling period.

The system can be calibrated for both degrees Celsius and Fahrenheit whereby the output of the V/F unit will accurately reflect one degree of temperature sensed for each pulse generated within the two second counting period. As should be evident from the disclosure above, R5 may be adjusted to calibrate the system for degrees Celsius while R6 can be similarly utilized to calibrate it for degrees Fahrenheit.

Switch S8 is a clock selection switch which enables the user to connect the coded output of either clock to the drive of the display provided the time and temperature switch S7, the operation of which will be explained below, is in the time position. Assuming that CLOCK 1 is selected as shown in FIG. 7B, contact S8-C will be positioned so that the base of T11 is shorted to ground and the transistor thus prevented from conducting. At the same time, transistor T12 will be allowed to conduct to provide an output signal in the collector circuit thereof. This signal is applied to CLOCK 2 causing the output of the clock to appear as an infinitely high impedance to the display drive thus electrically disconnecting the clock from the drive. Changing the position of S8-C shuts off T12 while allowing T11 to conduct thereby switching the outputs of the clocks in reference to the drive.

It should be noted at this point that repositioning the time-temperature switch 57 to a temperature setting, removes the ground from both transistors T11, T12 via contact S7-C so that the two transistors conduct simultaneously to electrically disconnect both clocks in the manner described above. At this time, the output of the temperature measuring channel will be applied to the drive of the display to provide a readout of the sensed temperature in either degrees Celsius or degrees Fahrenheit.

Switch S9, having two sections A and B, acts in conjunction with S8-B to set real or actual time into a selected clock. The switch is a spring loaded device normally held in an off position as shown in FIG. 7B between a fast-set operative position and a slow-set operative position. Depending upon which clock is selected, the real time registered in the selected clock is presented in the display window thus allowing the clock to be accurately set to the desired real time. Switch S10, which is also a springloaded switch, allows for storing a desired down time into CLOCK 1 and a desired up time into CLOCK 2. When the switch is moved to the down position (FIG. 3), a grounding signal is applied to CLOCK 1 causing the stored alarm time to be presented in the display. This stored alarm time can be changed by holding switch S10 in the down position and operating the slow-fast time setting switch S9. When the desired alarm time is presented in the window the switches are released and the selected time stored in the clock. By moving the switch S10 to the up position, the alarm time stored in CLOCK 2 is similarly displayed and can be changed as described above.

Switch contact S7-B in the time-temperature switching network connects a display intensity circuit, made up of transistor T15 and diodes D7 and D8, into the circuit applied to the display drive to vary the illumination of the LEDs. Two intensity levels are provided for by switch S-11. These include a dim setting as shown selected in FIG. 7B and a bright setting. In the intensity circuit, D7 is a LED of the type employed in the display and is used as a reference in the base circuit of T15 whereby the voltage dropped across D7 is maintained across the LED segments in the display. Dim-bright switch S11 is arranged to change the current in the base circuit of T15 by changing the resistance in the circuit which, in turn, controls the output of the device and thus the brillance of the display.

Referring once again to FIG. 7B, integrated circuits U9, 10 and 11 make up the components of the transmission gate 20. The units are hex transmission gates, three of which are required to accommodate the sixteen line input to the display. When switch section S7-A is in a time position as shown in FIG. 7B, the gate circuits are connected to ground and the gate output appears as an infinitely high impedance to the display drive thus effectively disconnecting the gate from the drive. Moving S7-B to the opposite or temperature position connects the gate circuits to the power supply voltage which, in turn, connects the gates to the display drive causing a sensed temperature to be displayed.

The transistor T16 forms an inverter 40 (FIG. 4) that is positioned between the clock and the clear inputs to FF3 which is contained in U6. The inverter serves to set the Q3 output of FF3 to a low state prior to the possible occurrence of an overflow condition in the BCD counter. The two BCD counters 38 are included in U5 and the BCD decoder 39 contained in U7 and U8. Completing the circuitry, FF1 and FF2, which form part of the time generating network, are housed in dual J-K flip flop U4 and the two and gates, AND 1 and 2, are contained in a quad two-input unit U3.

Switch S12 (FIG. 2) is electrically connected into the power supply circuit and provides for the on-off cycling of the air condition blower by means of relay K3 (FIG. 7A). This allows for the circulation of air through the control region regardless of the operational state of the air conditioning equipment.

As can be seen from the present disclosure, the thermostatic controller of the present invention is furnished with an easily readable digital display that provides a number of useful readouts relating to both time and temperature. The display is also employed as a useful tool in programming alarm times into the two programmable temperature control channels so that different temperature levels can be maintained in the comfort control region at desired periods of the day. This latter feature, because of the accuracy and ease of selection afforded the user, can be utilized to save energy through careful regulation of the activity of the associated heating and cooling equipment.

While this invention has been described with reference to the structure disclosed herein, it is not confined to the details set forth, and this application is intended to cover such modifications or changes as may come within the scope of the following claims.

We claim:

1. In a thermostatic control device of the type having an electrical sensor for sensing the temperature within an air conditioned region and generating a voltage signal indicative of the sensed temperature, first and second programmable control circuits operatively associated with the sensor which, when selectively energized, maintain the conditioned region at one of said programmed temperature levels and switching means conditionable by an alarm signal to energize one of said control circuits and deenergize the other, the improvement comprising a digital display for providing a visual readout in response to a coded input, temperature measuring means for generating a coded output in response to the voltage signal produced by said sensor for driving the display to provide a readout of the sensed temperature, first and second clock means being adapted to generate a coded output signal for driving said display to provide a readout of a time contained in said clock, each clock further including an alarm circuit for applying a conditioning alarm signal to said switching means when an alarm time stored in said clock is reached, and selecting means operatively associated with the input of said display to connect one of said coded outputs to said display and disconnect the other of said coded outputs whereby a desired readout is presented in said display.

2. The thermostatic device of clam 1 wherein said selecting means further includes means for placing the non-selected coded outputs at a high impedance whereby the non-selected outputs are electrically disconnected from the display.

3. The thermostatic device of claim 1 wherein said temperature measuring means includes a convertor for changing the voltage signal of said sensor to a pulsed signal having a recurrence rate indicative of the sensed temperature a counter for registering the number of pulses generated by the counter in a prescribed period, encoder means for placing the registered count in a form acceptable by said display.

4. The thermostatic device of claim 3 wherein said converter is operatively connected to said sensor by means of an amplifier having means for selectively placing a conversion resistance into the amplifier circuit whereby its output signal is indicative of a sensed voltage in degrees Fahrenheit or degrees Celsius.

5. The thermostatic device of claim 1 wherein each clock has a switch means operatively associated therewith for selectively applying a real time signal to the display or an alarm time signal.

6. The thermostatic device of claim 5 having further means associated with each clock for setting real time and stored time contained in each clock to a desired setting.

7. Thermostatic apparatus for use in association witn an air conditioning system for providing heating or cooling, the apparatus including a sensor for sensing the temperature within the conditioned region and for generating a voltage signal indictive of said temperature, first and second programmable control circuits selectively connected with the temperature sensor for controlling the operation of the heating and cooling equipment whereby the conditioned region is maintainable at a first and a second temperature level, an electronic switch conditionable upon receipt of an alarm signal to open one of the control circuits and simultaneously close the other, a temperature measuring channel operatively associated with said sensor for converting the voltage signal to a coded output adapted to drive a digital display, a digital display, a pair of clocks, each clock being arranged to provide a coded output suitable for driving said display to provide a readout of a time contained in said clock, and each clock further including an alarm circuit for applying a conditioning signal to said electronic switch to change the state of said switch upon the occurrence of an alarm time stored therein, and selector means for connecting one of the coded outputs to the display to obtain a selected readout thereof.

8. The apparatus of claim 7 wherein said sensor is a thermistor.

9. The apparatus of claim 8 wherein said thermistor and said first and second control circuits are contained in a bridge circuit arranged to compare the voltage over the closed control circuit with that over the thermistor and further including control means for operating the air conditioning equipment when said bridge is unbalanced.

10. The apparatus of claim 9 wherein each control circuit contains a variable resistor for regulating the voltage dropped over said circuit.

11. The apparatus of claim 7 wherein said temperature measuring channel contains resistance means for acting upon said voltage signal to provide a readout in degrees Celsius or degrees Fahrenheit.

12. The apparatus of claim 11 wherein each clock has switching means associated therewith for providing a coded output to the display indicative of either real time contained in said clock or the alarm time stored therein.

* * * * *